United States Patent [19]

Charlebois et al.

[11] Patent Number: 4,489,830

[45] Date of Patent: Dec. 25, 1984

[54] RETAINER FOR PACKAGED OPTICAL FIBER SPLICES AND ORGANIZING TRAY UTILIZING SUCH RETAINERS

[75] Inventors: Leonard J. Charlebois, Kanata; James R. Scott, Ashton; Robert J. Barber, Kanata, all of Canada

[73] Assignee: Northern Telecom Limited, Montreal, Canada

[21] Appl. No.: 560,541

[22] Filed: Dec. 12, 1983

[51] Int. Cl.³ .................. B65D 85/20; B65D 85/62; B65D 1/36

[52] U.S. Cl. .................. 206/316; 206/443; 206/329; 206/565; 350/96.21; 269/903

[58] Field of Search ............ 206/316, 214, 329, 328, 206/443, 565, 379, 365; 350/96.21; 269/903; 220/21

[56] References Cited

U.S. PATENT DOCUMENTS

| | | | |
|---|---|---|---|
| 1,980,141 | 11/1934 | MacGregor | 206/365 |
| 2,844,244 | 7/1958 | Hanson | 206/379 |
| 3,822,783 | 7/1974 | Mortensen | 206/329 |
| 3,846,740 | 11/1974 | Damon | 206/328 |
| 4,254,865 | 3/1981 | Pacey et al. | 206/316 |
| 4,418,815 | 12/1983 | Anderson et al. | 206/329 |

*Primary Examiner*—William T. Dixson, Jr.
*Attorney, Agent, or Firm*—Sidney T. Jelly

[57] ABSTRACT

A packaged optical fiber splice is held in a retainer formed by two pairs of cantilever members having inwardly facing ribs at their top edges. The members of a pair are spaced so that after pushing a packaged splice between the ribs, deforming the members slightly, the packaged splice is freely positioned between the cantilever members which are at least substantially stress free. The splice is retained by the ribs. A slot in the base of the retainer provides a seating for the lower edge of the splice and restrains the splice against longitudinal movement. A plurality of retainers are provided in an organizing tray.

10 Claims, 9 Drawing Figures

RETAINER FOR PACKAGED OPTICAL FIBER SPLICES AND ORGANIZING TRAY UTILIZING SUCH RETAINERS

This invention relates to a retainer for holding a packaged optical fiber splice and to an arrangement comprising a tray, or a plurality of trays, having retainers.

Optical fiber cables require splicing of the individual fibers at the junction of cables. The fibers are spliced, typically by fusion splicing, and the splice protected, and strengthened, by enclosing or packaging in protection members. The protection members are then positioned in a retainer in an organizing tray. The tray provides room for a length of fiber either side of the splice which provides some spare length. This is bent round in the tray and the dimensions of the tray are such that the radius of the bend is large enough to prevent undue losses in the fiber.

A retainer should hold a splice in position without producing any stress on the splice. Once positioned, a splice is normally in that position for a long time and the retainer should hold the splice without being affected by climatic conditions. It has been found that molded plastic retainers which are stressed by the insertion of a protected splice, the stress remaining as long as the splice is in position, suffer from relaxation during use. An attempt to mold an organizer tray using a stiff grade of plastic with the retainer members molded integrally but using a soft, flexible, grade of plastic, while overcoming the problem of relaxation, is extremely difficult to manufacture, and is expensive.

The present invention provides a retainer which is molded as a separate unit and is then attached to a tray. This can be by bonding or by snap action, for example. The retainer has cantilever members extending up from a base, forming two pairs of members spaced laterally. The members have inwardly extending ribs at their top edges. An elongate slot extends at least partly through the base between the cantilever members. A packaged splice is pushed down between the pairs of cantilever members and rests in the slot, below the ribs. Thus, once the splice is in position, the cantilever members are unstressed. Lengthwise movement of the splice is prevented by the ends of the slot in the base.

The invention will be readily understood by the following description of certain embodiments by way of example, in conjunction with the accompanying drawings, in which.

Figure 1:
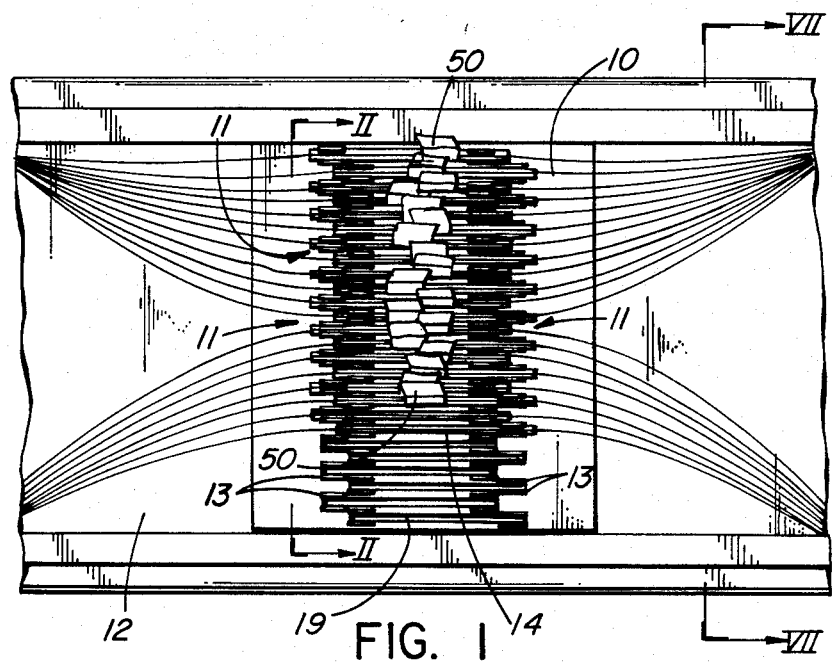
FIG. 1 is a top plan view of the center part of a tray, with a multiple retainer member in position and fiber splices in the individual retainers.

Illustrated in FIG. 1 is a retainer member, indicated generally at 10, having a plurality of retainers, indicated generally at 11. In this figure, the member 10 is seen attached to an organizer tray 12. Each retainer has two pairs of cantilever members 13 spaced apart across the member, in the direction of the length of the tray. In FIG. 1, a packaged splice, indicated at 14, is positioned in several retainers.

Figure 2:
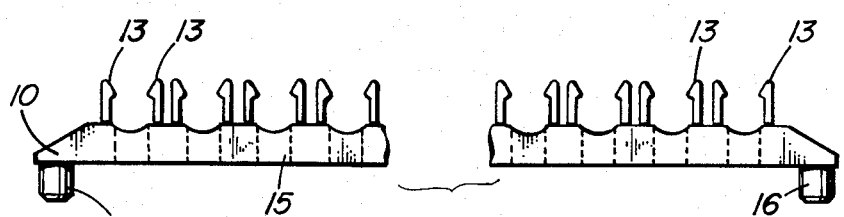
FIG. 2 is a cross-section of the retainer member only on the line II—II of FIG. 1, to a larger scale with splice omitted.
Figure 3:
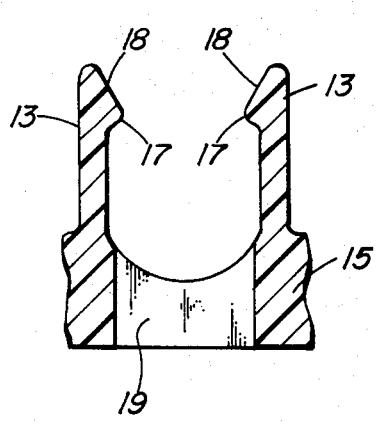
FIGS. 3 and 4 are cross-sections through an individual retainer, without a packaged splice and with a packaged splice respectively.
Figure 4:
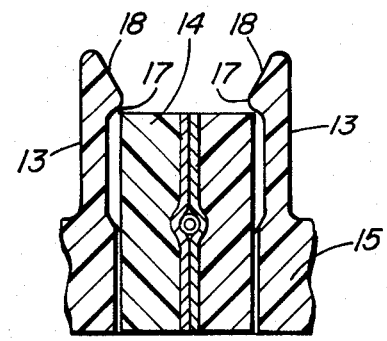

The form of the members 13, and the arrangement of retainers, is seen more clearly in FIGS. 2, 3 and 4. In FIG. 2 there is shown the pairs of members 13, and one particular way by which the retainer member can be attached to a tray. From a bottom web 15 of the retainer member 10 extend projections 16 which pass through holes in the base of the tray. These projections can be rivetted over to retain the retainer member in position. Alternatively they can be split, with outwardly extending ribs at the bottom, to give a snap assembly.

As readily seen in FIG. 3, each cantilever member 13 has an inwardly projecting rib 17 near its top edge, with an inwardly and downwardly inclined surface 18 extending from the top edge to the rib. A slot 19 extends through the web 15 between the members 13, the slot extending a short distance beyond the pairs of members 13, at each end, as seen in FIG. 1.

Figure 5:
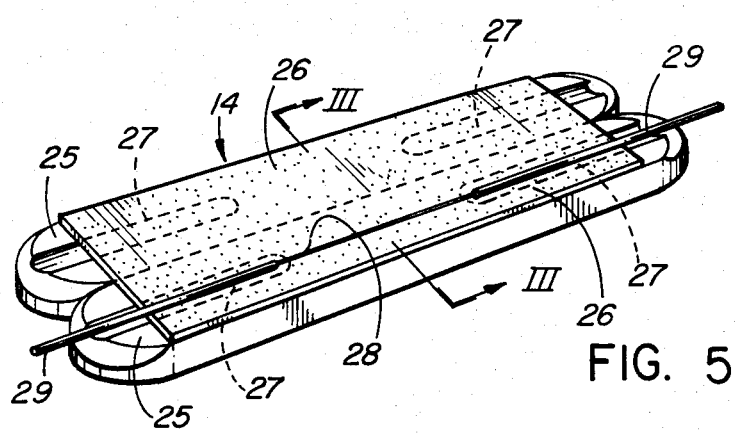
FIG. 5 is a perspective view of a splice in the process of being packaged or protected.
Figure 6:
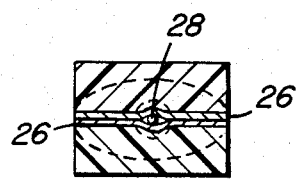
FIG. 6 is a cross-section through a protected splice.

FIG. 4 illustrates the arrangement of a packaged splice 14 situated in a retainer. The packaged splice is of the form as described in U.S. Pat. No. 4,254,865 issued Mar. 10, 1981 to the present assignee and as illustrated in FIGS. 5 and 6. The packaged splice is inserted into a retainer by pushing it down between the pairs of cantilever members 13. The members deflect apart as the lower edge of the packaged splice 14 push against surfaces 18. Once the packaged splice has moved fully into the retainer, the top edge is below the ribs 17 and the members 13 snap over the packaged splice. The members 13 are thus not under stress. The splice sits in the slot 19 and is therefore restrained from lengthwise movement. With the retainer member fitted to a tray, the packaged splice rests on the base of the tray. However, if retainers are made as individual units, or even as multiple units, without having a tray base or other surface under them, the slot 19 can be arranged to extend only part way through the web 15. This arrangement can also be used with trays.

The splice protecting package, in one form, is illustrated in FIGS. 5 and 6. It comprises two flat members 25 hingedly connected by a layer of adhesive material 26. The members 25 have shallow semi-circular grooves 27 extending in from each end. A fusion spliced fiber 28 is positioned on one member, the coated portions of the fused fiber, indicated at 29, positioned over the grooves 27. The members are then hinged or folded together, gripping the fused fibers between them, as seen in FIG. 6. This packaging or protection is described in more detail in the above mentioned patent.

Figure 7:
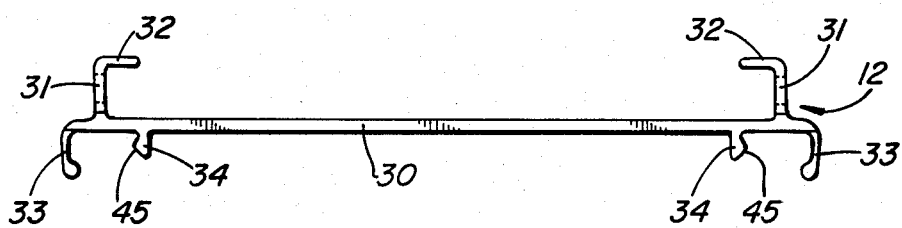
FIG. 7 is a cross-section of a tray, on the line VII—VII of FIG. 1.
Figure 8:
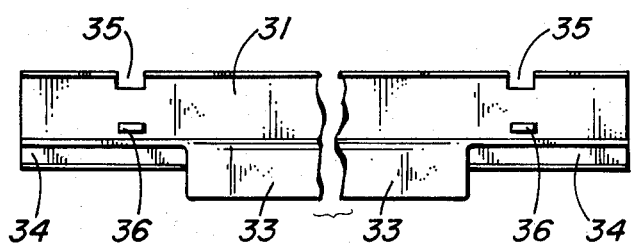
FIG. 8 is a side view of a tray.

One form of tray is illustrated in cross-section in FIG. 7, and in side view in FIG. 8. The tray has a base 30 with an upstanding web 31 adjacent each side edge, the webs having inwardly extending ribs 32. Extending downward from the side edges are further webs 33, and also downwardly extending ribs 34 extend parallel to and spaced a short distance in from webs 33.

Near each end of the tray, at each side, a slot 35 extends through the rib 32 and part way down web 31. Below each slot 35 there is an aperture 36 through the web 31. The use of these will be explained in conjunction with FIG. 9. The webs 33 extend only for part of the length of the tray, stopping short of the ends. However the ribs 34 extend the full length of the tray. However these particular features can vary to suit requirements. In a single tray usage webs 37 and ribs 34 may not be present.

Figure 9:
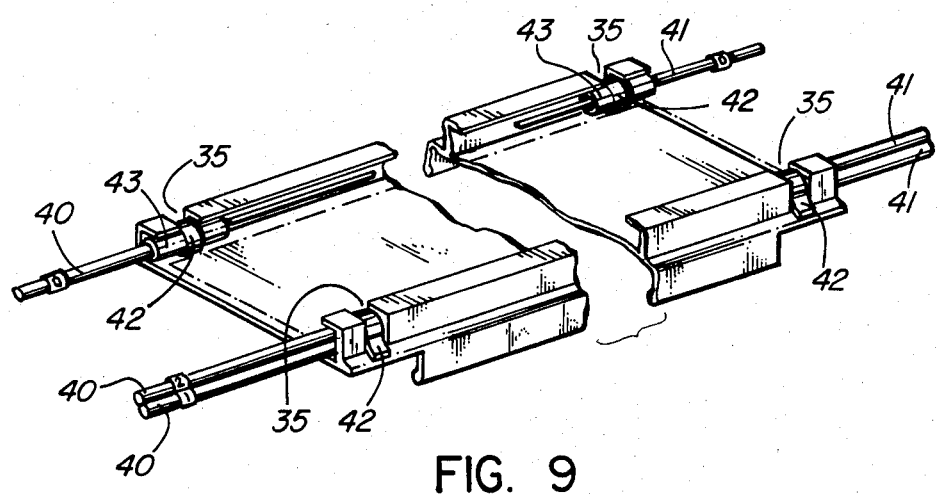
FIG. 9 is a perspective view of a tray, with retainers, illustrating the entry of fiber cables to a tray, and exit from a tray.

FIG. 9 illustrates a tray 12, with a multiple unit retainer 10, and with optical fiber cables entering and leaving, the cables indentified at 40 entering at one end, and at 41 at the other end. The cables will contain several fibers and the cable casing is removed at the end to expose a length of each fiber. The ends of the casing are positioned at the ends of the tray, against the webs 31 under the ribs 32. Ties 42 pass through the aperture 36 in webs 31, round the cables and through the slots 35. If necessary a sleeve 43 can be positioned on a cable to assist in the gripping of the cable by the tie. The ties 42 act as strain reliefs and prevent the cables and fibers from being pulled out of the tray.

Trays can be mounted, one above the other. The inwardly extending ribs 32 of a lower tray snap into position above convex formations 45 on the outer surfaces of the ribs 34. A cover, having ribs similar to ribs 34 on a tray, can be snapped into position on a top tray. Several trays, stacked one on top of another, can be positioned in an enclosure or housing, as described in U.S. Pat. No. 4,359,262, issued Nov. 16, 1982, to the present assignee.

The top surface of the tray base can be ribbed to make it easy to pick up fibers resting on the tray base. The retainers are offset or staggered, in the retainer member, as illustrated in FIG. 1, to make it easier to grip tabs 50 attached to the packaged splices, the tabs identifying splices.

What is claimed is:

1. A retainer for a packaged optical fiber splice, comprising:
   a bottom web;
   two pairs of cantilever members spaced apart along said bottom web and extending up therefrom, the members of a pair spaced apart a distance slightly larger than the thickness of a packaged splice, the pairs spaced a distance less than the length of the packaged splice;
   an inwardly extending rib at an upper part of each cantilever member, the inner surfaces of said ribs spaced apart a distance less than the thickness of the packaged splice;
   an elongate slot in said bottom web and extending between said cantilever members, said slot extending for a distance substantially equal to the length of the packaged splice;
   said ribs on said cantilever members spaced from the base of said slot a distance at least equal to the height of the packaged splice; and
   the arrangement being such that a packaged splice can be pushed down between said cantilever members, the packaged splice positioned in said slot and restrained from longitudinal movement, the packaged splice positioned freely between the cantilever members, the ribs engaging over the packaged splice and the cantilever members being substantially free of stress.

2. A retainer assembly for a plurality of packaged optical fiber splices comprising a bottom web and a plurality of retainers on said bottom web, each retainer comprising;
   two pairs of cantilever members spaced apart along said bottom web and extending up therefrom, the members of a pair spaced apart a distance slightly larger than the thickness of a packaged splice, the pairs spaced a distance less than the length or the packaged splice;
   an inwardly extending rib at an upper part of each cantilever member, the inner surfaces of said ribs spaced apart a distance less than the thickness of the packaged splice;
   an elongate slot in said bottom web and extending between said cantilever members, said slot extending for a distance substantially equal to the length of the packaged splice;
   said ribs on said cantilever members spaced from the base of said slot a distance at least equal to the height of the packaged splice; and
   the arrangement being such that a packaged splice can be pushed down between said cantilever members, the packaged splice positioned in said slot and restrained from longitudinal movement, the packaged splice positioned freely between the cantilever members, the ribs engaging over the packaged splice and the cantilever members being substantially free of stress.

3. An assembly as claimed in claim 2, each retainer being offset laterally relative to the immediately adjacent retainer, whereby the retainers form a zig-zag arrangement across said bottom web.

4. An assembly as claimed in claim 2 including an organizing tray having a base, said bottom web attached to said base of the organizing tray.

5. An assembly as claimed in claim 2 including means extending from said bottom web for attachment to a support member.

6. An assembly as claimed in claim 4 said bottom web bonded to said base of said organizing tray.

7. An assembly as claimed in claim 4, said bottom web including downwardly extending projections, said projections extending through said base of said tray to attach said bottom web to said tray.

8. An assembly as claimed in claim 4, said slots extending through said bottom web, an upper surface of said base of said tray defining said base of said slots.

9. An assembly as claimed in claim 4, said tray including an upstanding web adjacent to each side edge of said base and extending lengthwise of said base, and an inwardly extending rib along the upper edge of each upstanding web.

10. An assembly as claimed in claim 9, said tray including a web extending downward at each side edge of said base and a rib extending downward from each side edge of said base spaced inward from the downwardly extending webs, the arrangement such that the upstanding webs and inwardly extending ribs of a lower tray can be positioned between the downwardly extending webs and downwardly extending rib of an upper tray.

* * * * *